United States Patent
Tsirtsis

(10) Patent No.: US 9,148,335 B2
(45) Date of Patent: Sep. 29, 2015

(54) THIRD PARTY VALIDATION OF INTERNET PROTOCOL ADDRESSES

(75) Inventor: George Tsirtsis, London (GB)

(73) Assignee: QUALCOMM Incorporated, San Diego, CA (US)

(*) Notice: Subject to any disclaimer, the term of this patent is extended or adjusted under 35 U.S.C. 154(b) by 854 days.

(21) Appl. No.: 12/241,399

(22) Filed: Sep. 30, 2008

(65) Prior Publication Data

US 2010/0083354 A1 Apr. 1, 2010

(51) Int. Cl.
- *H04L 9/32* (2006.01)
- *G06F 7/04* (2006.01)
- *H04L 29/12* (2006.01)
- *H04L 29/06* (2006.01)

(52) U.S. Cl.
CPC .... *H04L 29/12783* (2013.01); *H04L 29/12915* (2013.01); *H04L 29/12952* (2013.01); *H04L 61/35* (2013.01); *H04L 61/6059* (2013.01); *H04L 61/6077* (2013.01); *H04L 63/0807* (2013.01); *H04L 63/0823* (2013.01); *H04L 63/1466* (2013.01)

(58) Field of Classification Search
USPC .......... 726/2, 3, 5, 10; 713/159, 185
See application file for complete search history.

(56) References Cited

U.S. PATENT DOCUMENTS

| | | | |
|---|---|---|---|
| 6,065,117 A * | 5/2000 | White ............................ 713/159 |
| 6,725,376 B1 | 4/2004 | Sasmazel et al. |
| 6,772,331 B1 | 8/2004 | Hind et al. |
| 7,181,620 B1 | 2/2007 | Hur |
| 7,231,663 B2 | 6/2007 | Medvinsky |
| 7,392,390 B2 | 6/2008 | Newcombe |
| 7,451,217 B2 | 11/2008 | Wardrop |
| 7,457,283 B2 | 11/2008 | Dalton, Jr. et al. |
| 7,568,098 B2 | 7/2009 | Yeates et al. |
| 7,644,275 B2 | 1/2010 | Mowers et al. |
| 7,661,129 B2 | 2/2010 | Panasyuk et al. |
| 7,877,480 B2 | 1/2011 | Wardrop |
| 7,885,410 B1 | 2/2011 | Meier et al. |

(Continued)

FOREIGN PATENT DOCUMENTS

| CN | 1351789 A | 5/2002 |
|---|---|---|
| CN | 1645792 A | 7/2005 |

(Continued)

OTHER PUBLICATIONS

Risk Management of Digital Certificates in Ad Hoc and P2P Networks, Zhou et al, May 2008, IEEE.*

(Continued)

*Primary Examiner* — Luu Pham
*Assistant Examiner* — Jahangir Kabir
(74) *Attorney, Agent, or Firm* — Jeffrey D. Jacobs

(57) ABSTRACT

A device can connect to a network over a first interface to configure and obtain an IP address. To communicate with nodes in a second network, over a second interface, the IP address can be validated by a trusted third party. The validation can include conducting a return routability test to validate a Prefix of the IP address. Cryptographically Generated Address verification can be utilized to verify the validity of an Interface Identifier included in the IP address. If the IP address is validated, the trusted third party can include the address in a verification ticket, which can also include a signature of the trusted third party. The device can provide the verification ticket to nodes in the second network as authentication of the device.

10 Claims, 13 Drawing Sheets

(56) References Cited

U.S. PATENT DOCUMENTS

| | | | |
|---|---|---|---|
| 7,899,188 B2 | 3/2011 | Abu-Amara | |
| 7,907,970 B2 | 3/2011 | Park et al. | |
| 7,917,946 B2 | 3/2011 | Lindholm et al. | |
| 7,933,253 B2* | 4/2011 | Akram et al. | 370/338 |
| 7,958,041 B2 | 6/2011 | Stanforth et al. | |
| 8,036,207 B2 | 10/2011 | Sivakumar et al. | |
| 8,041,627 B2 | 10/2011 | Stanforth et al. | |
| 8,170,048 B1 | 5/2012 | Gossett et al. | |
| 8,171,123 B2 | 5/2012 | Takeda et al. | |
| 8,195,233 B2 | 6/2012 | Morikuni et al. | |
| 8,199,768 B1 | 6/2012 | Gossett et al. | |
| 8,213,900 B2 | 7/2012 | Heutschi et al. | |
| 8,213,903 B2 | 7/2012 | Pudney et al. | |
| 8,234,208 B2 | 7/2012 | Stanforth et al. | |
| 8,239,927 B2 | 8/2012 | Benaloh et al. | |
| 8,249,966 B2 | 8/2012 | Stanforth et al. | |
| 8,295,871 B2 | 10/2012 | Axnas et al. | |
| 8,332,923 B2 | 12/2012 | Oba et al. | |
| 8,364,951 B2 | 1/2013 | Peterka et al. | |
| 8,434,133 B2 | 4/2013 | Kulkarni et al. | |
| 8,474,028 B2 | 6/2013 | Kulkarni et al. | |
| 8,666,077 B2 | 3/2014 | Patel et al. | |
| 8,671,444 B2 | 3/2014 | Kulkarni et al. | |
| 2003/0084302 A1* | 5/2003 | de Jong et al. | 713/185 |
| 2003/0229789 A1 | 12/2003 | Morais et al. | |
| 2004/0064693 A1 | 4/2004 | Pabla et al. | |
| 2005/0044411 A1 | 2/2005 | Somin et al. | |
| 2005/0074124 A1* | 4/2005 | Thornton et al. | 380/277 |
| 2005/0076244 A1 | 4/2005 | Watanabe | |
| 2005/0160273 A1 | 7/2005 | Oishi | |
| 2005/0172333 A1* | 8/2005 | Kim | 726/5 |
| 2006/0083205 A1 | 4/2006 | Buddhikot et al. | |
| 2006/0294022 A1 | 12/2006 | Dayan et al. | |
| 2007/0154016 A1 | 7/2007 | Nakhjiri et al. | |
| 2007/0177731 A1* | 8/2007 | Spies et al. | 380/47 |
| 2007/0198831 A1 | 8/2007 | Suzuki et al. | |
| 2007/0233827 A1 | 10/2007 | McKnight | |
| 2008/0108322 A1 | 5/2008 | Upp | |
| 2008/0162936 A1* | 7/2008 | Haddad | 713/171 |
| 2008/0221951 A1 | 9/2008 | Stanforth et al. | |
| 2009/0158394 A1 | 6/2009 | Oh et al. | |
| 2009/0217033 A1 | 8/2009 | Costa et al. | |
| 2009/0233578 A1 | 9/2009 | Feder et al. | |
| 2010/0069067 A1 | 3/2010 | Vanderveen et al. | |
| 2010/0070760 A1 | 3/2010 | Vanderveen et al. | |
| 2011/0004766 A1* | 1/2011 | Camarillo et al. | 713/176 |
| 2012/0240204 A1* | 9/2012 | Bhatnagar et al. | 726/5 |
| 2013/0227655 A1 | 8/2013 | Vanderveen et al. | |
| 2014/0310782 A1 | 10/2014 | Vanderveen et al. | |

FOREIGN PATENT DOCUMENTS

| | | |
|---|---|---|
| CN | 1956376 A | 5/2007 |
| EP | 1557973 | 7/2005 |
| JP | 2003500923 A | 1/2003 |
| JP | 2003520535 A | 7/2003 |
| JP | 2004274193 A | 9/2004 |
| JP | 2005110112 A | 4/2005 |
| JP | 2005210285 A | 8/2005 |
| JP | 2007074391 A | 3/2007 |
| JP | 2007166189 A | 6/2007 |
| JP | 2008510341 A | 4/2008 |
| JP | 2009533984 A | 9/2009 |
| KR | 20080040256 | 5/2008 |
| TW | 498669 B | 8/2002 |
| WO | WO0072506 A1 | 11/2000 |
| WO | WO2004019640 A1 | 3/2004 |
| WO | WO-2006016328 A1 | 2/2006 |
| WO | 2007121378 A2 | 10/2007 |
| WO | WO-2007112692 A1 | 10/2007 |
| WO | 2008043449 A1 | 4/2008 |

OTHER PUBLICATIONS

Trusted Mobile Interaction via Extended Digital Certificates, Tao et al, 2006, IEEE.*

Bagnulo M et al: "Efficient security for IPv6 multihoming" 14-20 Computer Communication Review, ACM, New York, NY, US LNKD-001:10.1145/1064413.1064420, vol. 35, No. 3, Apr. 1, 2005, pp. 61-68, XP002506494 ISSN: 0146-4833* abstract line.

International Search Report and Written Opinion—PCT/US2009/058153, International Search Authority—European Patent Office—Sep. 1, 2006.

Partial International Search Report—PCT/US2009/058153—International Search Authority—European Patent Office, Sep. 24, 2009.

T. Aura. Cryptographically Generated Addresses (CGA). Mar. 2005. http://tools.ietf.org/html/rfc3972.

D. Johnson, et al. Mobility Support in IPv6. Jun. 2004. http://tools.ietf.org/html/rfc3775 (section 5.2.5).

F. DuPont, et al. Care-of Address Test for MIPv6 using a State Cookie draft-dupont-mipv6-rrcookie-06.txt. Jun. 2, 2008. http://tools.ietf.org/html/draft-dupont-mipv6-rrcookie.

Brik V et al., "DSAP: A Protocol for Coordinated Spectrum Access" 2005 1st IEEE International Symposium on New Frontiers in Dynamic Spectrum Access Netwroks, Baltimore MD US LNKD-DOI:10.1109/SYSPAN.2005.1542680 Nov. 8, 2005 pp. 611-614, XP010855160.

Lootah et al. "TARP: ticket-based address resolution protocol" Computer Networks, Elsevier Science Publisers B.V., Amsterdam, NL, vol. 51, No. 15, Aug. 23, 2007 pp. 4322-4337, XP022211699.

Vladimir Brik et al: "Towards an Architecture for Efficient Spectrum Slicing" 8th IEEE Workshop on Mobile Comping Systems and Applications, 2007 Hotmobile IEEE, Piscataway, NJ US Mar. 1, 2007 pp. 64-69 XP031165181.

Yihong Zhou et al., "Authentication, Authorization, and Accounting for Real-Time Secondary Market Services" Communications, 2005, ICC 2005 IEEE International Conference on Seoul, Korea May 16-20, 2005 vol. 2 Jun. 16, 2005 pp. 1005-1009 xp010825440.

Park J.M. et al., A Ticket Based AAA Security Mechanism in Mobile IP Network, pp. 210-219 (ICCSA 2003).

Taiwan Search Report—TW098132765—TIPO—Sep. 7, 2012.

* cited by examiner

THIRD PARTY VALIDATION OF INTERNET PROTOCOL ADDRESSES

BACKGROUND

I. Field

The following description relates generally to wireless communications and more particularly to address validation in peer-to-peer networks.

II. Background

Communication systems are widely deployed to provide various types of communication and to transfer information regardless of where a user is located (e.g., inside or outside a structure) and whether a user is stationary or moving (e.g., in a vehicle, walking). For example, voice, data, video and so forth can be provided through communication systems. A typical communication system, or network, can provide multiple users access to one or more shared resources. For example, a system may use a variety of multiple access techniques such as Frequency Division Multiplexing (FDM), Time Division Multiplexing (TDM), Code Division Multiplexing (CDM), Orthogonal Frequency Division Multiplexing (OFDM), and others.

Generally, wireless communication networks are established through a mobile device communicating with a base station or access point. The access point covers a geographic range or cell and, as the mobile device is operated, the mobile device can be moved in and out of these geographic cells.

A network can also be constructed utilizing solely peer-to-peer devices without utilizing access points or the network can include both access points and peer-to-peer devices. These types of networks are sometimes referred to as ad hoc networks. Ad hoc networks can be self-configuring whereby when a mobile device (or access point) receives communication from another mobile device, the other mobile device is added to the network. As mobile devices leave the area, they are dynamically removed from the network. Thus, the topography of the network can be constantly changing.

Some devices can utilize two or more interfaces to communicate on different networks. For example, a first interface can provide access to a first network and a second interface can provide access to a second network. An area of concern can arise if an address, configured and validated over the first interface, is to be utilized over the second interface. In this situation, peers reachable over the second interface might not be able to know whether the address is trustworthy and owned by the device asserting ownership of the address.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with validation of addresses through third party validation. An address can be configured and validated over a first interface and transmitted to a third party for validation. If the address is validated, the address can be communicated to peers over another interface in such a manner that the peers have some assurance that the address is owned by the transmitting device.

An aspect relates to a method that enables third party validation of IP addresses. The method includes obtaining an IP address and requesting certification for the IP address from a trusted third party. The method also includes receiving a validation ticket that includes the certified IP address and communicating the validation ticket to a node.

Another aspect relates to a wireless communications apparatus that includes a memory and a processor. The memory retains instructions related to obtaining an IP address and requesting certification for the IP address from a trusted third party. The memory also retains instructions related to receiving a validation ticket that includes the certified IP address and communicating the validation ticket to a node. The processor is coupled to the memory and is configured to execute the instructions retained in the memory.

A further aspect relates to a communications apparatus that enables third party validation of IP addresses. The communications apparatus includes means for obtaining an IP address and means for requesting certification for the IP address from a trusted third party. The communications apparatus also includes means for receiving a validation ticket that includes the certified IP address and means for communicating the validation ticket to a node.

Still another aspect relates to a computer program product that includes a computer-readable medium. The computer-readable medium includes a first set of codes for causing a computer to obtain an IP address and a second set of codes for causing the computer to request certification for the IP address from a trusted third party. The computer-readable medium also includes a third set of codes for causing the computer to receive a validation ticket that includes the certified IP address and a fourth set of codes for causing the computer to communicate the validation ticket to a node.

Still another aspect relates to at least one processor configured to enable third party validation of IP addresses. The processor includes a first module for obtaining an IP address and a second module for requesting certification for the IP address from a trusted third party. The processor also includes a third module for receiving a validation ticket that includes the certified IP address and a fourth module for communicating the validation ticket to a node. The IP address is obtained over a first interface and the validation ticket is communicated to the node over a second interface.

Another aspect relates to a method that enables third party validation of IP addresses. The method includes receiving from a first node a request for certification of an IP address and determining validity of the IP address. The method also includes transmitting a validation ticket certified by a trusted party to the first node. The ticket includes the IP address.

A further aspect relates to a communications apparatus that includes a memory and a processor. The memory retains instructions related to receiving from a first node a request for certification of an IP address and determining validity of the IP address. The memory also retains instructions related to transmitting a validation ticket certified by a trusted party to the first node, wherein the ticket includes the IP address. The processor is coupled to the memory and is configured to execute the instructions retained in the memory.

Yet another aspect relates to a communications apparatus that enables third party validation of IP addresses. The communications apparatus includes means for receiving from a first node a request for certification of an IP address and means for determining validity of the IP address. The communications apparatus also includes means for transmitting a validation ticket certified by a trusted party to the first node, the ticket includes the IP address.

Still a further aspect relates to a computer program product that includes a computer-readable medium. The computer-readable medium includes a first set of codes for causing a computer to receive from a first node a request for certification of an IP address and a second set of codes for causing the computer to determine validity of the IP address. The computer-readable medium also includes a third set of codes for causing the computer to transmit a validation ticket certified by a trusted party to the first node. The ticket includes the IP address.

Yet another aspect relates to at least one processor configured to enable third party validation of IP addresses. The processor includes a first module for receiving from a first node a request for certification of an IP address and a second module for determining validity of the IP address. The processor also includes a third module for transmitting a validation ticket certified by a trusted party to the first node. The ticket includes the IP address.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of the various aspects may be employed. Other advantages and novel features will become apparent from the following detailed description when considered in conjunction with the drawings and the disclosed aspects are intended to include all such aspects and their equivalents.

DETAILED DESCRIPTION

Figure 1:
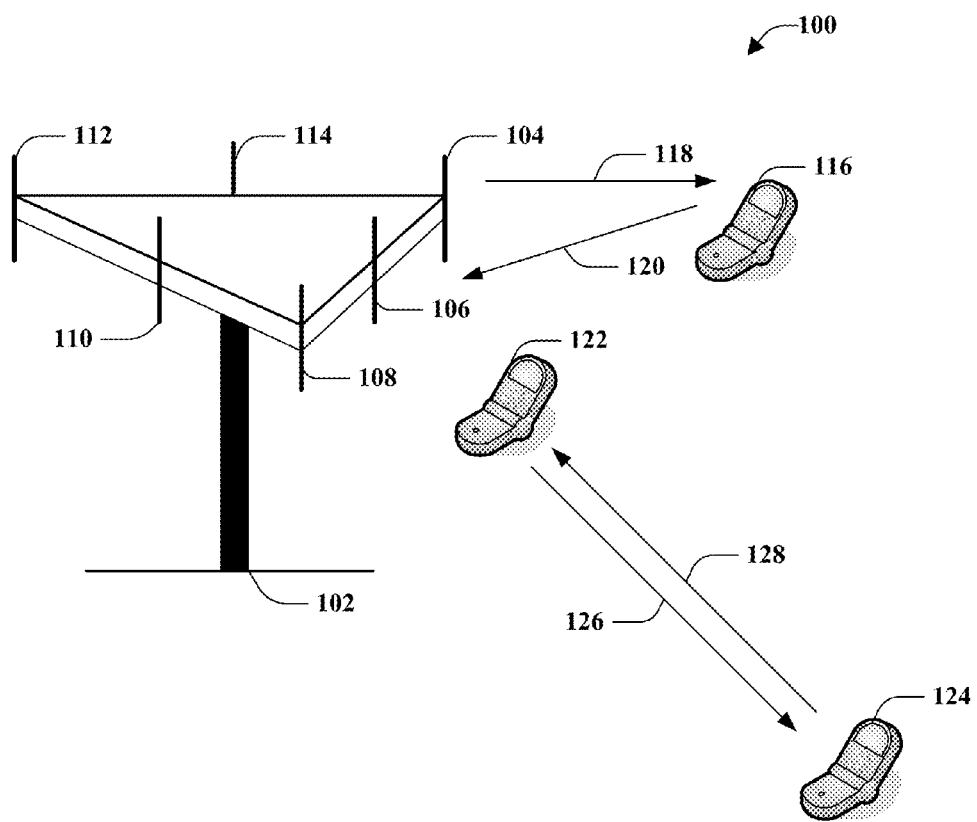
FIG. 1 illustrates a wireless communication system in accordance with various aspects.

Various aspects are now described with reference to the drawings. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing these aspects.

As used in this application, the terms "component", "module", "system", and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection with a device. A device can also be called, and may contain some or all of the functionality of a system, subscriber unit, subscriber station, mobile station, mobile, mobile device, wireless terminal, node, device, remote station, remote terminal, access terminal, user terminal, terminal, wireless communication device, wireless communication apparatus, user agent, user device, or user equipment (UE). A device can be a cellular telephone, a cordless telephone, a Session Initiation Protocol (SIP) phone, a smart phone, a wireless local loop (WLL) station, a personal digital assistant (PDA), a laptop, a handheld communication device, a handheld computing device, a satellite radio, a wireless modem card and/or another processing device for communicating over a wireless system. In accordance with some aspects, the device can be a wired device. Moreover, various aspects are described herein in connection with a base station. A base station may be utilized for communicating with wireless terminal(s) and can also be called, and may contain some or all of the functionality of, an access point, node, Node B, e-NodeB, e-NB, or some other network entity.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Referring now to FIG. 1, illustrated is a wireless communication system 100 in accordance with various aspects. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, an so forth), as will be appreciated by one skilled in the art. Additionally, the base station 102 can be a home base station, a Femto base station, and/or the like.

Base station 102 can communicate with one or more devices such as device 116; however, it is to be appreciated that base station 102 can communicate with substantially any number of devices similar to device 116. As depicted, device 116 is in communication with antennas 104 and 106, where antennas 104 and 106 transmit information to device 116 over a forward link 118 and receive information from device 116 over a reverse link 120.

In a frequency division duplex (FDD) system, forward link 118 can utilize a different frequency band than that used by reverse link 120, for example. Further, in a time division duplex (TDD) system, forward link 118 and reverse link 120 can utilize a common frequency band.

In addition, devices 122 and 124 can be communicating with one another, such as in a peer-to-peer configuration. Moreover, device 122 is in communication with device 124 using links 126 and 128. In a peer-to-peer ad hoc network, devices within range of each other, such as devices 122 and 124, communicate directly with each other without a base station 102 and/or a wired infrastructure to relay their communication. Additionally, peer devices or nodes can relay traffic. The devices within the network communicating in a peer-to-peer manner can function similar to base stations and relay traffic or communications to other devices, functioning similar to base stations, until the traffic reaches its ultimate destination. The devices can also transmit control channels, which carry information that can be utilized to manage the data transmission between peer nodes.

A communication network can include any number of devices or nodes that are in wireless (or wired) communication. Each node can be within range of one or more other nodes and can communicate with the other nodes or through utilization of the other nodes, such as in a multi-hop topography (e.g. communications can hop from node to node until reaching a final destination). For example, a sender node may wish to communicate with a receiver node. To enable packet transfer between sender node and receiver node, one or more intermediate nodes can be utilized. It should be understood that any node can be a sender node and/or a receiver node and can perform functions of either sending and/or receiving information at substantially the same time (e.g., can broadcast or communicate information at about the same time as receiving information) or at different times.

System 100 can be configured to enable a device to utilize an address that is configured and validated over a first interface on at least a second interface. A third party validation entity can validate the address in order for peers that would like to communicate with the device over at least the second interface to have some assurance that the device is the validated device.

Figure 2:
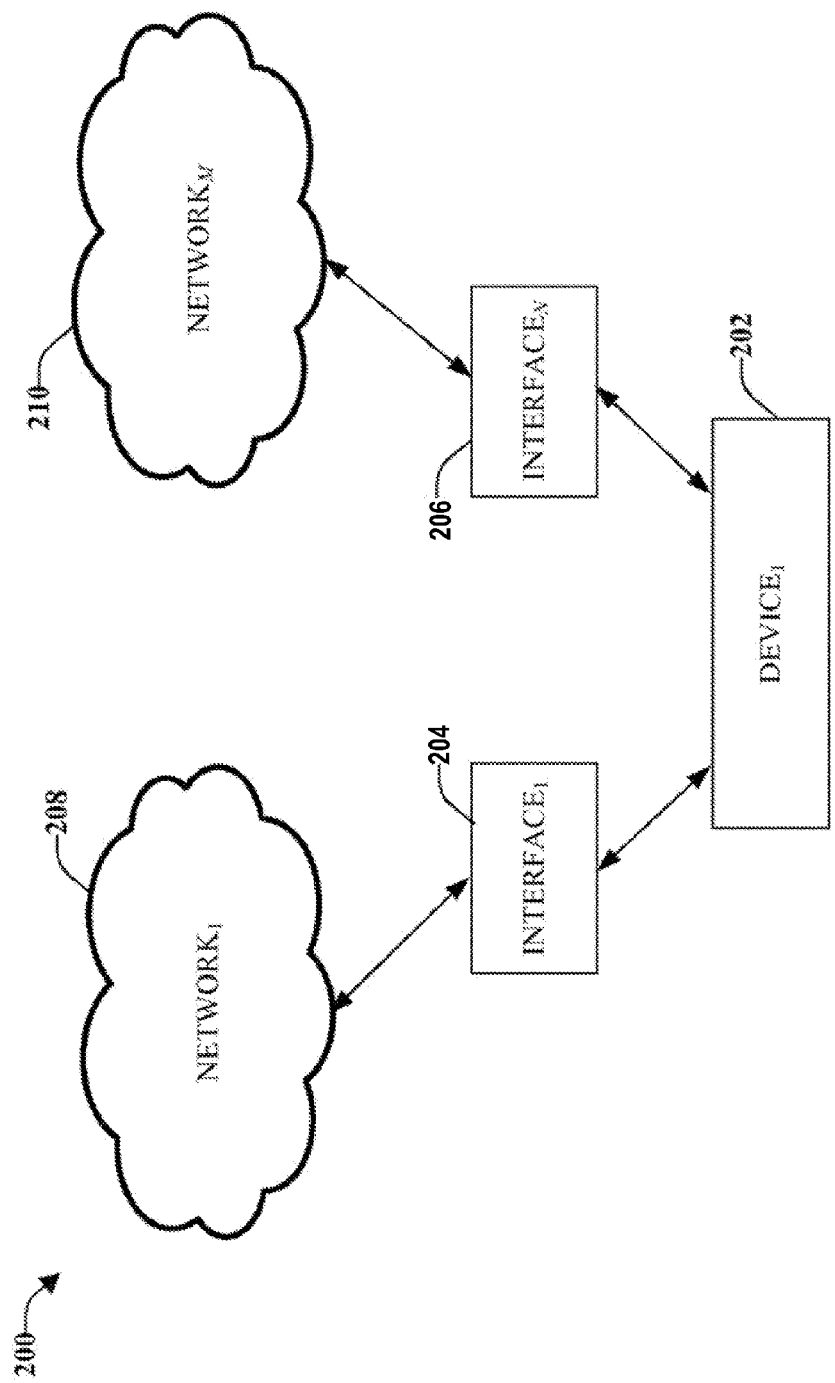
FIG. 2 illustrates a representation of an example system in accordance with various aspects.

FIG. 2 illustrates a representation of an example system 200 in accordance with various aspects. A device, illustrated as device$_1$ 202, can utilize multiple interfaces to connect to different networks. As illustrated, the interfaces are labeled interface$_1$ 204 and interface$_N$ 206, where N is an integer. The networks are labeled network$_1$ 208 and network$_M$ 210, where M is an integer. For example, a first network 208 can be a Wide Area Network (WAN) and a second network can be a wireless Interface of local scope, such as a Wireless Local Access Network (WLAN) or other peer-to-peer interface (which can include FlashLinQ).

Device$_1$ 202 can configure an Internet Protocol (IP) address on Interface$_1$ 204 with Network$_1$ 208. In accordance with some aspects, device$_1$ 202 can also utilize the same IP address on interface$_N$ 206, to communicate over network$_M$ 210. As will be discussed in further detail below, the IP address should be validated to provide peers, reachable over network$_M$ 210, with information so that the peers can trust that the address is valid (e.g., unique and owned by the device (device$_1$ 202) utilizing the IP address).

Figure 3:
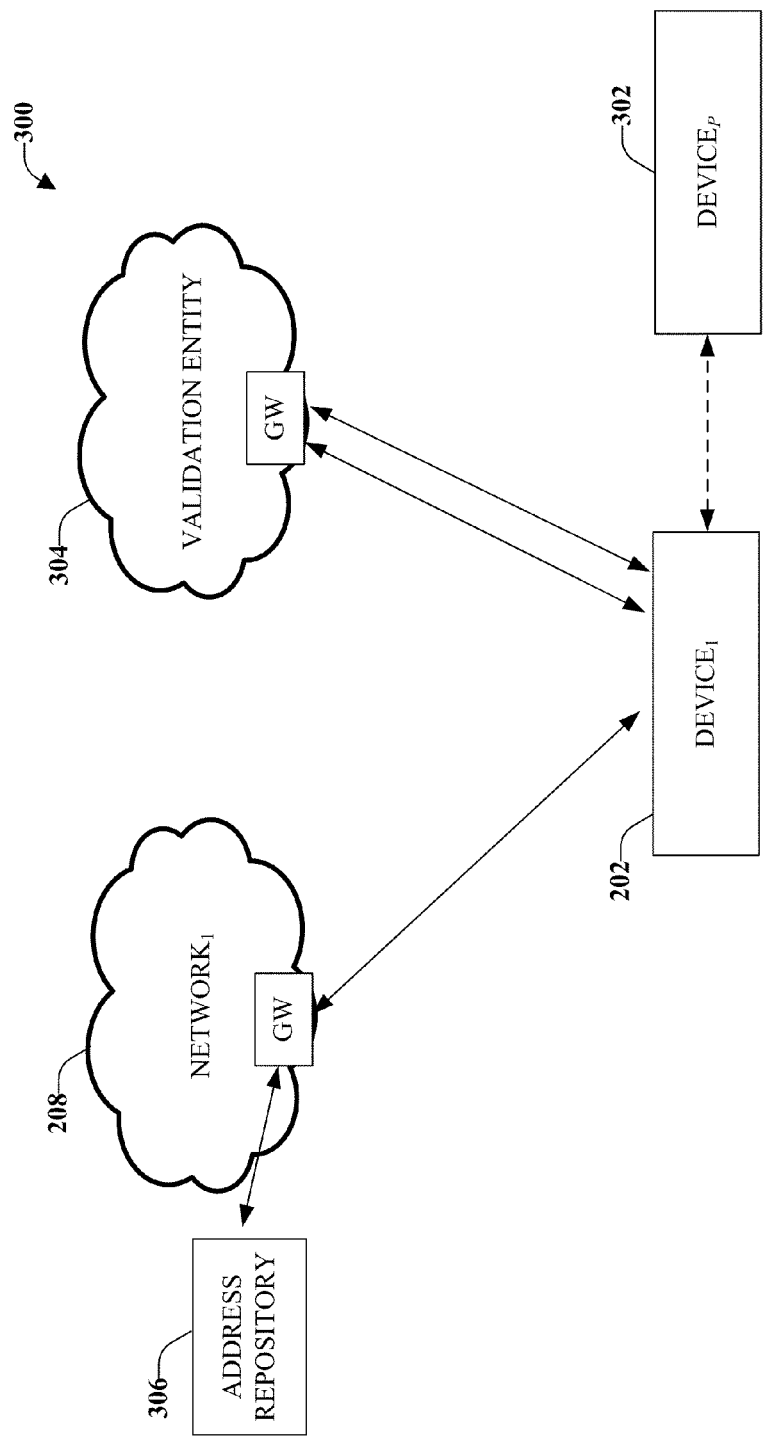
FIG. 3 illustrates an example network architecture for validation of IP addresses in accordance with one or more aspects.

FIG. 3 illustrates an example network architecture 300 for validation of IP addresses in accordance with one or more aspects. A device$_1$ 202 connects to network$_1$ 208 over a first interface, which can be connected to a network (e.g., Network$_1$ 208) that provides IP addresses. Network$_1$ 208 can be a Wide Area Network (WAN), a Wireless Wide Area Network (WWAN), a 3GPP network, a 3GPP2 network, a Local Area Network (LAN), a Wireless Location Area Network (WLAN), a home network, a DSL network, a CorporateDSL network, a cable, and/or other networks that provide interconnectivity and routing to a network of interest (e.g., the internet).

A number of validation steps can be performed by device$_1$ 202 and Network$_1$ 208 in order to configure an IP address. These validation steps can confirm that an IP address prefix is topologically correct and that an Interface Identifier (IID) utilized is correct for the device (e.g., device$_1$ 202). A prefix is topologically correct if the network routing points to the subnet where a device owning the prefix (e.g., device$_1$ 202) is located. An Interface ID is correct if the Interface ID identifies its owner on the same subnet (e.g., the subnet where the device owning the prefix is located). The IP address, configured for device$_1$ 202, can be retained in an address repository 306.

Various types of IP addresses can be utilized, such as an IPv4 address, an IPv6 address, and so forth. For example, the IP address can be an IPv4 address allocated through DHCPv4 or an IPv6 address allocated through DHCPv6. According to some aspects, the IP address can be an IPv6 address where a prefix portion is advertised through a neighbor discovery process. According to other aspects, the IP address is an IPv6 address where an Interface ID is a Cryptographically Generated Address (CGA).

Unlike a thirty-two bit long IPv4 address, IPv6 addresses usually have a clear boundary between the Prefix and the Interface ID. Typically, the IPv6 address is split into a sixty-four bit prefix and a sixty-four bit Interface ID. However, it should be understood that other types of splits are possible and can be utilized with the disclosed aspects.

If device$_1$ 202 desires to utilize the IP address (PREFIX+IID) that is configured and validated over a first interface over a second interface, an issue might arise regarding the validity of the IP address. For example, a second device, such as device$_P$ 302, where P is an integer, with which device$_1$ 202 desires to communicate might want to ensure that device$_1$ 202 is in fact the device that it claims to be (e.g. that it is not impersonating another device or it does not attempt to use the IP address of another device, which is also known as address spoofing). In other words, peers reachable over a second interface should be able to trust that the address is valid (e.g., owned by the device utilizing the address). According to various aspects, ascertaining that the address is valid can be of greater concern for directly connected peers on wireless mesh networks and other peer-to-peer technologies (e.g., FlashLinQ).

Thus, in accordance with some aspects, after configuring and validating an address on a first interface (e.g., over network$_1$ 208), device$_1$ 202 can request validation of the IP address from a third party validation entity 304. The third party validation entity 304 can be referred to by various names, such as a Ticket Issuer, an authorization server, or another trusted third party. In accordance with some aspects, the validation entity 304 can be an operator, an access provider, a peer-to-peer spectrum provider, or another authorization entity, including a FlashLinQ Ticket Issuer. Given a Prefix1 provided to Device$_1$ 202 by Network$_1$ 208, Device$_1$ 202 can generate a CGA(Y) Address (Prefix1 :: Y).

To validate the IP address, a return routability test and IID validation can be performed. The return routability test confirms to the validation entity 304 that the Prefix in the address routes back to the subnet where the claimed owner (e.g., Device$_1$ 202) is located. Further information related to the return routability test will be provided below. The IID Validation confirms that the IID utilized as part of the address was generated by the claimed owner of the address. In accordance with some aspects, the IID can be validated by performing a Cryptographically Generated Address Verification.

If the IP address is validated, the third party validation entity 304 can incorporate the IP address in a validation ticket, which is unique for the device, and return the ticket to the device. The validation ticket can be retained by device 202, such as in a storage media (e.g., computer readable medium, memory, and so forth). The validation ticket can include various information such as a device identifier, a validity period, a cryptographic signature of the authorizing device, as well as other information. For example, when Public Key Infrastructure (PKI) is utilized, the disclosed aspects can include the signing of the IP Address and possibly other information with a private key of the third party validation entity 304. Further information relating to validation tickets will be provided below with reference to FIG. 6.

The device claiming ownership over the IP address (e.g., device$_1$ 202) provides the validation ticket to peers (e.g., device$_P$ 302) over the second interface of device$_1$ 202. The second interface can be connected to a local network with directly connected peers, a multi-hoped mesh, and/or other networks. In accordance with some aspects, the second interface can be connected to a WLAN, a FlashLinQ, or other peer-to-peer technology. A peer (e.g., device$_P$ 302) receiving the validation ticket can confirm that a third party validation entity 304 (e.g., trusted by both devices 202 and 302) has validated the address by validating the ticket. The peer can check the third party signature included in the validation ticket. If the third party signature is correct, the peer can be satisfied that the IP address is valid.

In accordance with some aspects, when PKI is utilized, confirmation can include validation of the ticket's signature based on a public key of the third party validation entity 304. The public key can be known by the peer (e.g. device$_P$ 302) performing the validation. In accordance with some aspects, other mechanisms for providing that ticket validation exists (e.g., shared keys) can be utilized with the disclosed aspects.

Figure 4:
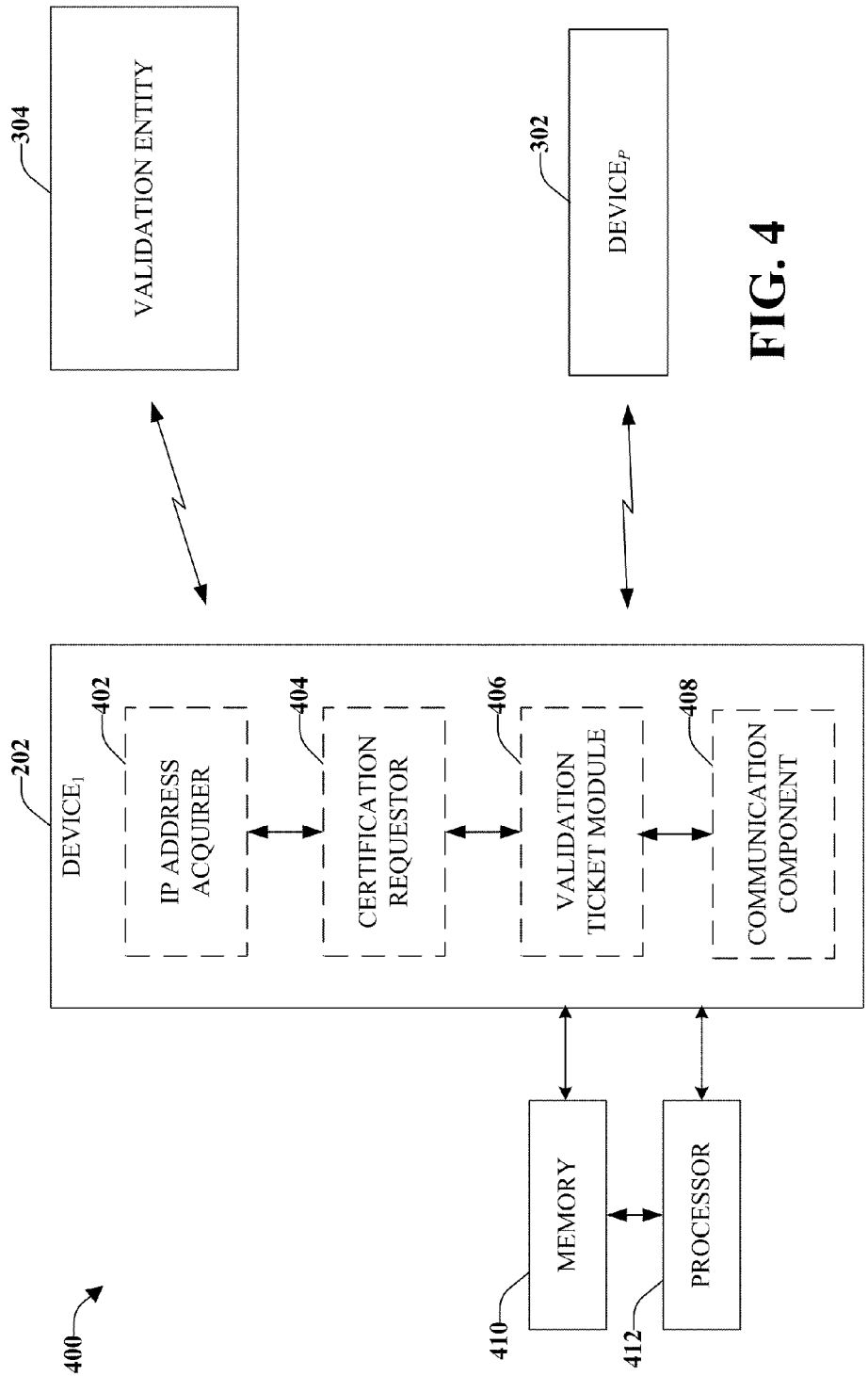
FIG. 4 illustrates a system that enables third party validation of IP addresses according to an aspect.

With reference now to FIG. 4, illustrated is a system 400 that enables third party validation of IP addresses according to an aspect. Included in system 400 is a first device (e.g., device$_1$ 202) that is configured to communicate with a validation entity 304 and with one or more other devices (e.g., device$_N$ 302). Device$_1$ 202 can utilize two or more interfaces for communication over different networks. In accordance with some aspects, the devices 202, 302 can communicate in a peer-to-peer topology.

Included in device$_1$ 202 is an IP address acquirer 402 that is configured to obtain at least a portion of an IP address. For example, the IP address portion can be obtained from a first network over a first interface. When the IP address portion obtained is not a full IP address (e.g., it is a Prefix), device$_1$ 202 attaches an Interface Identifier (IID) to the IP address portion to form a full address (e.g., IPv6 address). The IID can be a local interface identifier or it can be a locally generated ID.

In accordance with some aspects, if the IID is a locally generated ID it can be a cryptographically generated address (CGA). Cryptographically Generated Addresses are IPv6 address. The interface identifier can be generated by computing a cryptographic one-way hash function from a public key and one or more auxiliary parameters. Verification of the binding between the public key and the address can be established by re-computing the hash value and comparing the hash with the interface identifier.

In order to utilize the IP address over a second interface to a second network, a certification requestor 404 is configured to request certification for the IP address from a trusted third party (e.g., validation entity 304). According to some aspects, the IP address is obtained from a ticket issuer.

According to some aspects, the certification of the IP address (e.g., validity check) can include a return routability test. The return routability test can include receiving information from the validation entity 304 and returning a subset of the information to the validation entity. For example, if the information is a cookie, the cookie is returned to the validation entity. The return routability test can be utilized to verify the Prefix of the IP address. In accordance with some aspects, the return routability test can confirm a full IP address given to the device.

In accordance with some aspects, the certification of the IP address (e.g., validity check) can include an IID test. The IID test can include the computation of the IID according to Cryptographically Generated Address rules.

According to some aspects, the IP address can include a Prefix and an Interface Identifier. In these aspects, validation of the IP address indicates if the Prefix, the Interface Identifier, or both the Prefix and the Interface Identifier are valid.

If the IP address is validated, a validation ticket is received from the validation entity 302 and maintained by a validation ticket module 406. The validation ticket includes the certified IP address. According to some aspects, the validation ticket includes a signature of the trusted third party (e.g., the validation entity 304). Further information regarding the validation ticket will be provided below.

When communication is to be conducted with another device 302, the validation ticket is conveyed to the other device 302 by a communication component 408. The validation ticket, which includes the IP address, is utilized by device 302 to confirm the validity of device 202. For example, the other device 302 can check the third party signature and, if correct, it indicates that the IP address is valid. If the third party signature is not correct, it can indicate that the IP address is not valid and/or there is another issue related to validity of device 202.

System 400 can include memory 410 operatively coupled to device 202. Memory 410 can be external to device 202 or can reside within device 202. Memory 410 can store information and/or protocols related to receiving an IP address, requesting certification for the IP address, receiving and storing a validation ticket that includes the certified IP address, conveying the validation ticket to a node, and other suitable information related to receiving and/or transmitting data in a communication network. System 400 can employ the stored information, protocols, and/or algorithms to achieve improved communications in a wireless network as described herein.

A processor 412 can be operatively connected to device 202 and/or memory 410 to facilitate analysis of information related to third party validation of IP addresses in a communication network. Processor 412 can be a processor dedicated to analyzing and/or generating information received by device 202, a processor that controls one or more components of system 400, and/or a processor that both analyzes and generates information received by device 202 and controls one or more components of system 400. Processor 412 can execute the instructions retained in memory 410.

It should be appreciated that the data store (e.g., memories, storage media) components described herein can be either volatile memory or nonvolatile memory, or can include both volatile and nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of example and not limitation, RAM is available in many forms such as synchronous RAM (DRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory of the disclosed aspects are intended to comprise, without being limited to, these and other suitable types of memory.

Figure 5:
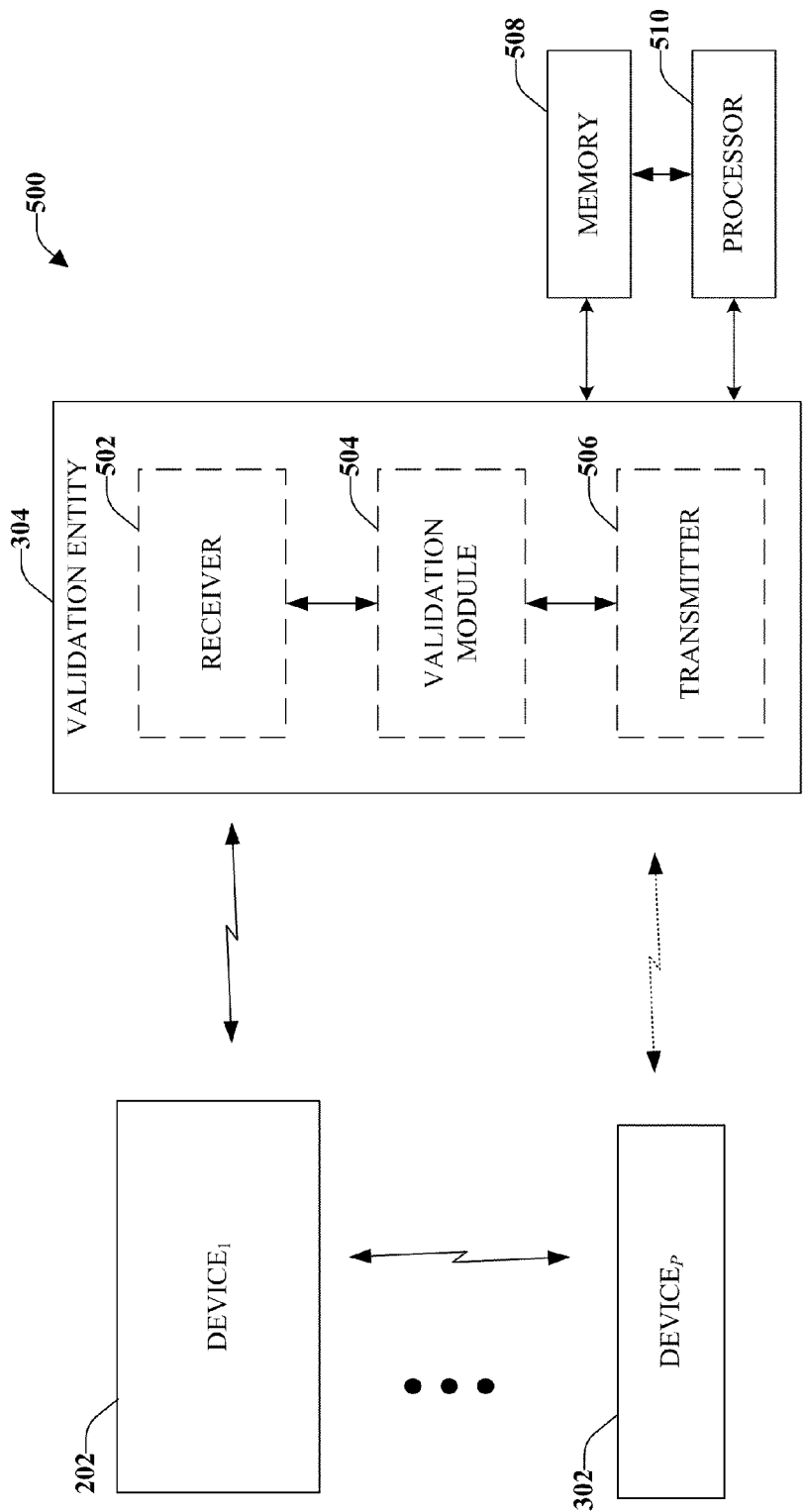
FIG. 5 illustrates another system that enables third party validation of IP addresses in accordance with an aspect.

FIG. 5 illustrates another system 500 that enables third party validation of IP addresses in accordance with an aspect. Included in system are a number of devices (e.g., device$_1$ 202 through device$_P$ 302) and a validation entity 304. The validation entity 304 should be a trusted third party. In accordance with some aspects, there are more than one validation entities utilized (e.g. different devices can utilize different validation entities).

Included in validation entity 302 is a receiver 502 that is configured to receive from a first device (e.g., mobile device$_1$ 202) a request for certification of an IP address. The first device might have received the IP address from a first network over a first interface. Validation entity 302 can also receive requests for any number of other devices (e.g., devices 302) for validation of respective IP addresses.

A validation module 504 is configured to determine validity of the IP address. The IP address can include a Prefix and an Interface. In accordance with some aspects, the validity determination includes a return routability test. The return routability test can confirm that the Prefix in the IP address routes back to the subnet where device$_1$ 202 is located (e.g., that the Prefix used is topologically correct for device$_1$ 202). The test can be conducted by transmitting some information (e.g., a cookie) to device$_1$ 202 using the IP address and requesting at least a subset of the information (e.g., a cookie) to be communicated back to validation entity 304 by device$_1$ 202.

In accordance with some aspects, the validity determination includes verifying whether an IID included in the IP address is corrected. Verification of the IID can be conducted utilizing Cryptographically Generated Addresses.

If the IP address is confirmed (e.g., the subset of information was received from device$_1$ 202), a validation ticket is configured that includes the IP address. Other information can also be included in the validation ticket, which will be described in further detail below. The validation ticket, certified by the validation entity 304, is conveyed to the first device by a transmitter 506. Device$_1$ 202 can utilize the validation ticket to communicate with other devices (e.g. device$_P$ 302) over another interface (e.g. an interface other than the interface over which the IP address was obtained).

System 500 can include memory 508 operatively coupled to validation entity 304. Memory 508 can be external to, or can reside within, validation entity 304. Memory 508 can store information and/or protocols related to receiving a request for certification of an IP address, determining validity of the IP address, transmitting a validation ticket in reply to the received request, and other suitable information related to receiving and/or transmitting data in a communication network. System 500 can employ the stored information, protocols, and/or algorithms to achieve improved communications in a wireless network as described herein.

A processor 510 can be operatively connected to validation entity 304 and/or memory 508 to facilitate analysis of information related to third party validation of IP addresses in a communication network. Processor 510 can be a processor dedicated to analyzing and/or generating information received by validation entity 304, a processor that 510 analyzes information related to receiving and/or transmitting data in a communication environment, a processor that controls one or more components of system 500, and/or a processor that both analyzes and generates information received by validation entity 304 and controls one or more components of system 500. Processor 510 can execute the instructions retained in memory 508.

Figure 6:
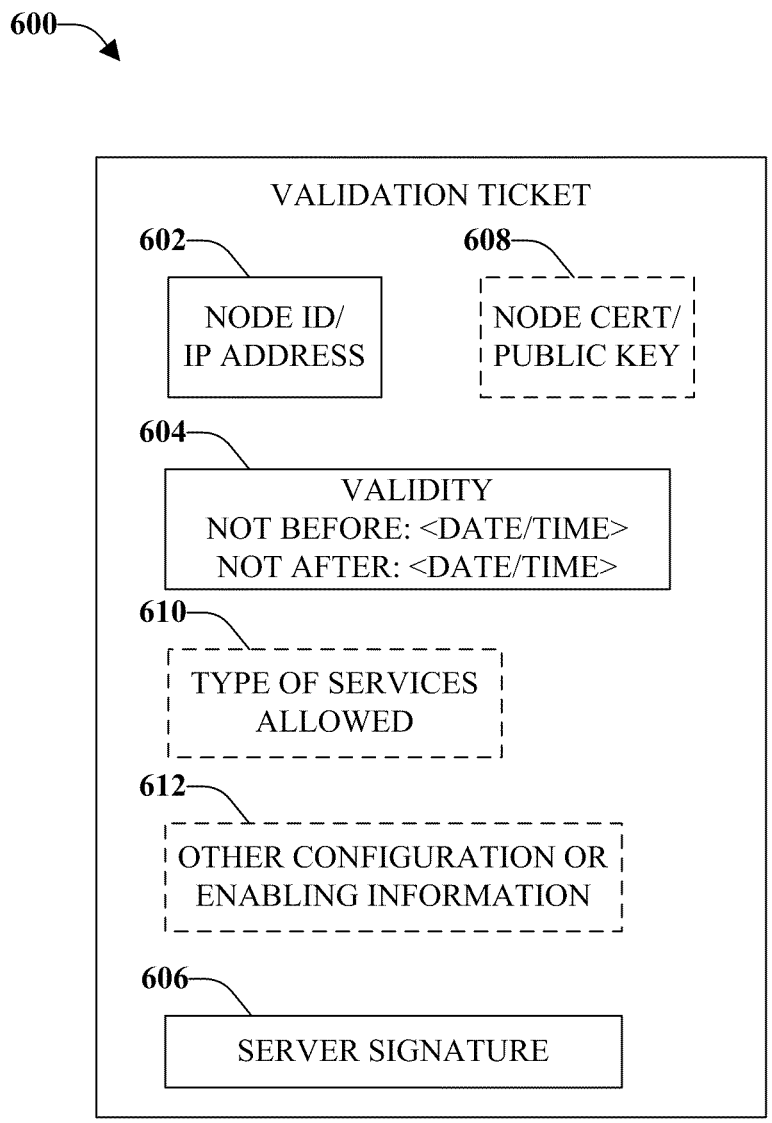
FIG. 6 illustrates an example validation ticket that can be utilized with the disclosed aspects.

FIG. 6 illustrates an example validation ticket 600 that can be utilized with the disclosed aspects. It should be understood that the illustrated and described validation ticket 600 is provided for ease of understanding this detailed description and other validation tickets can be utilized with the disclosed aspects.

Included in validation ticket 600 are a node identifier/IP Address 602, a validity period 604, and a cryptographic signature 606 of the authorizing server (e.g., validation entity 304). The node identifier/IP address 602 is the IP address validated by the entity issuing the validation ticket 600 (e.g., validation entity, authorizing server).

In accordance with some aspects, the cryptographic signature of the authorizing server can cover all the data included in the ticket 600. The validity period 604 can include a start time (e.g., not before: <date/time>) and an end time (e.g., not after: <date/time>). A validity period 604 can create a level of security because, if a validation ticket is fraudulently obtained by a misbehaving device, upon expiration, that validation ticket will no longer be usable by the misbehaving device.

In accordance with an optional aspect, the validation ticket 600 can contain information that can be utilized to authenticate the ticket holder (e.g. device). This information, represented as optional by the dashed line at 608, can be in the form of a digital certificate, a public key, a hash of a public key belonging to the device as indicated by the node identifier 602, as well as other authentication means.

The validation ticket 600 can optionally contain (as noted by the dashed line) information related to the type of services allowed 610 to be accessed by the ticket holder and/or configuration or enabling information 612. The service information 610 and other information 612 can include a piece of data provided to all authorized devices and utilized in an ad-hoc network to configure the physical or media access control channels, so that only authorized devices can communicate using these channels. In accordance with some aspects, the other information 612 includes configuration information and/or an assigned parameters list, which can be utilized by other devices that are validating the validation ticket in order for the other devices to determine how to correctly configure the link.

In view of the exemplary systems shown and described above, methodologies that may be implemented in accordance with the disclosed subject matter, will be better appreciated with reference to the following flow charts. While, for purposes of simplicity of explanation, the methodologies are shown and described as a series of blocks, it is to be understood and appreciated that the claimed subject matter is not limited by the number or order of blocks, as some blocks may occur in different orders and/or at substantially the same time with other blocks from what is depicted and described herein. Moreover, not all illustrated blocks may be required to implement the methodologies described herein. It is to be appreciated that the functionality associated with the blocks may be implemented by software, hardware, a combination thereof or any other suitable means (e.g. device, system, process, component). Additionally, it should be further appreciated that the methodologies disclosed hereinafter and throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

Figure 7:
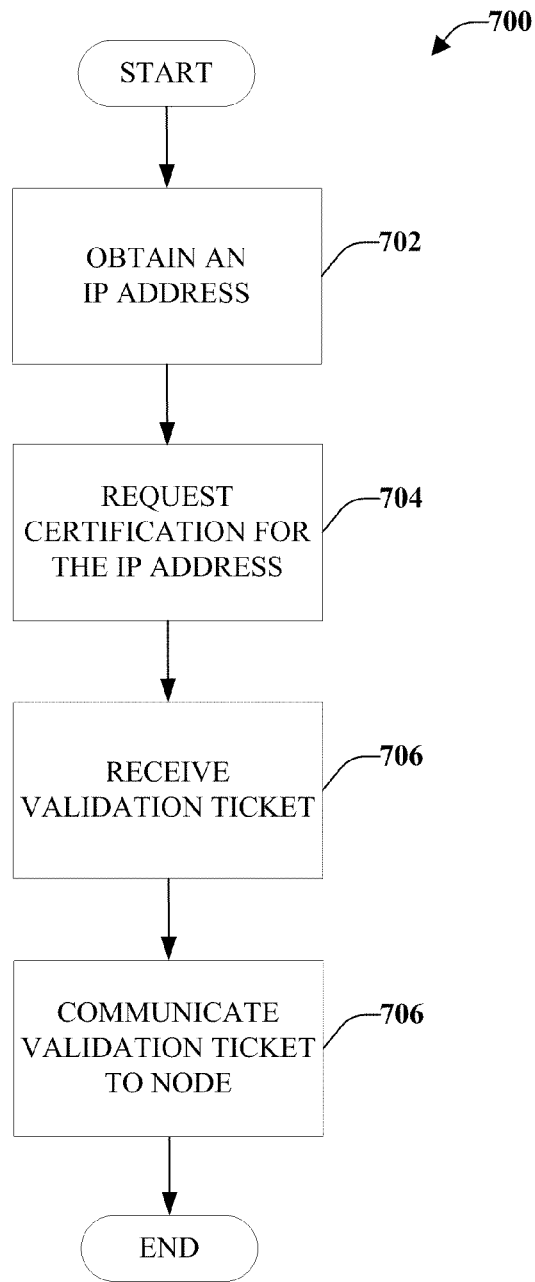
FIG. 7 illustrates a method for obtaining validation of an IP address according to an aspect.

FIG. 7 illustrates a method 700 for obtaining validation of an IP address according to an aspect. Validation of the IP address can be utilized when the IP address is obtained over a first interface and the IP address is to be utilized to communicate over a second network. The validation provides information that the address is owned by the device exerting ownership of the address.

At 702, an IP address is obtained. For example, at least part of the IP address can be obtained from a first network over a first interface. The first network can be a Wide Area Network (WAN), a Wireless Wide Area Network (WWAN), a 3GPP network, a 3GPP2 network, a Local Area Network (LAN), a Wireless Location Area Network (WLAN), a home network, a DSL network, a CorporateDSL network, a cable, and/or other networks that provide interconnectivity and routing to a network of interest (e.g., the internet). In accordance with some aspects, at least part of the IP address is obtained from a ticket issuer.

In accordance with some aspects, the IP address includes a Prefix and an Interface Identifier. The Prefix can be obtained from a trusted third party. The Interface Identifier can be cryptographically generated.

A request for certification of the IP address is made, at 704. This request can be transmitted to a trusted third party, such as a validation server, a ticket issuer, an authorization server, a validation entity, and so forth. Certification of the IP address can include a return routability test procedure. This test procedure can include receiving information from the trusted third party and sending a request to return at least a subset of the information to the trusted third party. Communicating the subset of information to the trusted third party can confirm that the Prefix of the IP address is topologically corrected for the claimed owner. In accordance with some aspects, if a return routability test is utilized, the IP address is not validated if the subset of information is not received by the trusted third party.

In accordance with some aspects, an Interface ID (IID) validation procedure is utilized to validate the IP address. The IID portion of the address can be checked using Cryptographically Generated Addresses.

At 706, a validation ticket is received, indicating the IP address has been validated. The validation ticket can include the certified IP address. The validation ticket can also include a signature of the trusted third party. When communication with a network over another interface is desired, the validation ticket can be conveyed to a device in the other network. The other device can utilize the validation ticket to verify that the IP address of device transmitting the ticket is valid.

Figure 8:
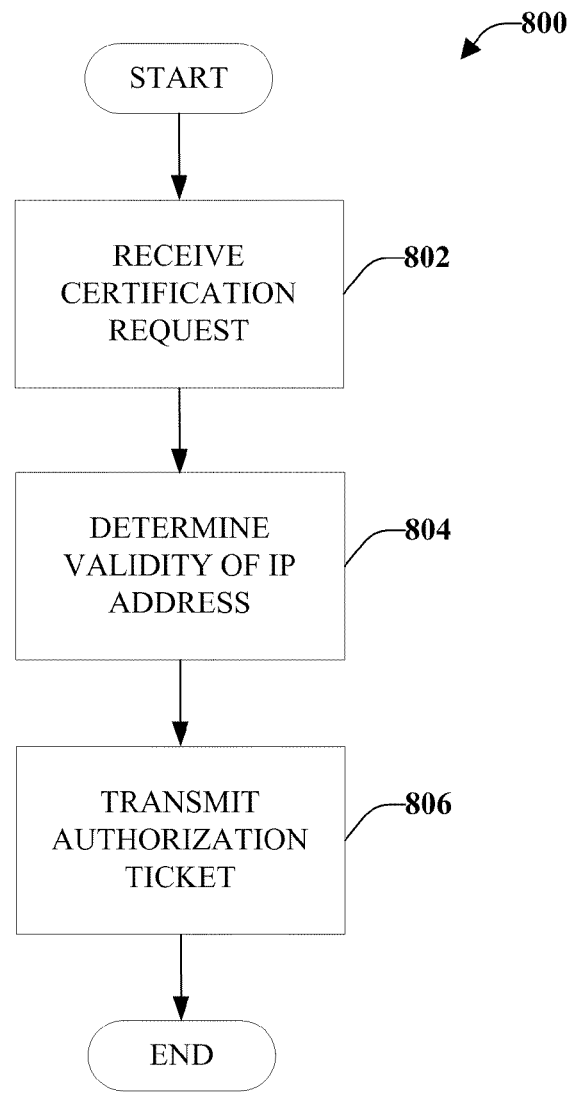
FIG. 8 illustrates a method for validating IP addresses according to one or more aspects.

FIG. 8 illustrates a method 800 for validating IP addresses according to one or more aspects. Method 800 starts, at 802, when a request for certification of an IP address is received from a node. At 804, the validity of the IP address is determined. The IP address can include a Prefix and an Interface Identifier. In accordance with some aspects, the IP address validity is determined by a return routability test that checks the validity of the Prefix. The return routability test confirms whether or not a Prefix of the IP address is topologically correct. In accordance with some aspects, the return routability test includes transmitting information to the requesting node with a request for at least a subset of the information to be returned from the node. If the node returns the requested information, the return routability test passes (e.g. the IP address is confirmed). If the node does not return the requested information, the return routability test fails. For example, if the information is a cookie, the cookie is returned from the node. In accordance with some aspects, verifying the validity of the Interface Identifier can include performing Cryptographically Generated Address verification.

If the IP address is valid (e.g., the return routability test is passed), a validation ticket is created and transmitted to the node that requested certification of the IP address. In accordance with some aspects, the validation ticket includes a signature of the entity validating the IP address. The validation ticket can be utilized by the requesting node in order to communicate over different interfaces.

Figure 9:
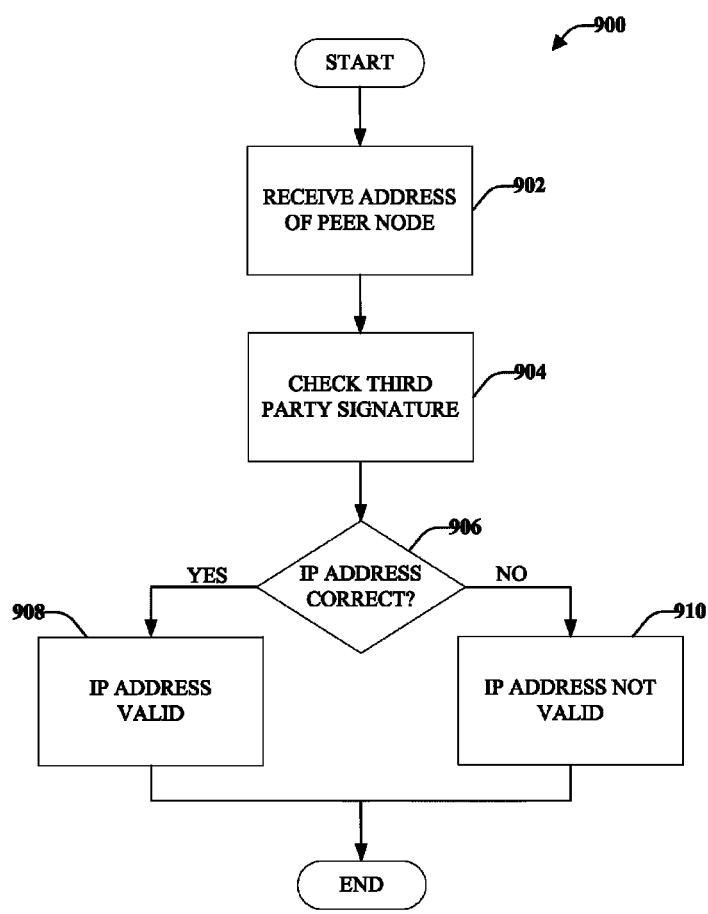
FIG. 9 illustrates a method for validation of addresses between two peer nodes.

FIG. 9 illustrates a method 900 for validation of addresses between two peer nodes. At 902, an address (e.g., IP address) of a peer node is received. The address can include a Prefix portion and an IID portion. An address of the receiving node can be conveyed to the peer node at substantially the same time as receiving the peer node's address or at a different time (e.g., before receiving peer node's address, after receiving peer node's address).

At 904, the third party signature is checked. A determination is made, at 906, whether the signature is correct. If the signature is correct ("YES"), it is assumed, at 908, that the IP address is valid. If the determination is that the signature is not correct ("NO"), at 910, it is assumed that the IP address is not valid.

Figure 10:
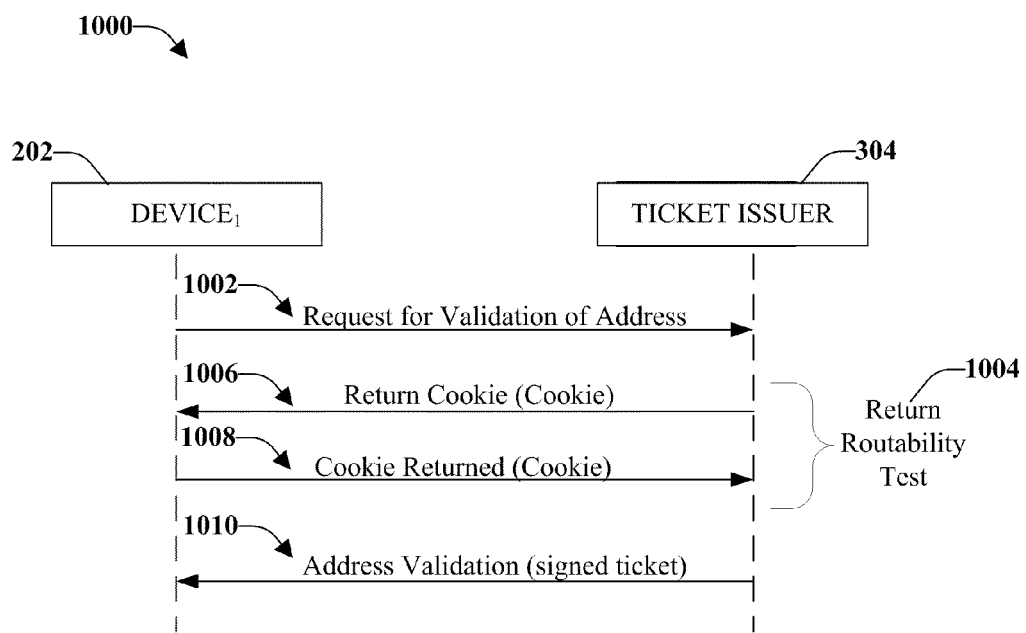
FIG. 10 illustrates a flow diagram of communication between a device and a ticket issuer for validation of an IP address in accordance with various aspects.

With reference now to FIG. 10, illustrated is a flow diagram 1000 of communication between a device 202 and a ticket issuer 304 for validation of an IP address in accordance with various aspects. The ticket issuer 304 can be a trusted third party. The device 202 sends a request for validation of an IP address, at 1002. In order to validate the IP address, a return routability test 1004 can be conducted. The return routability test confirms to the ticket issuer 304 that the Prefix in the address routes back to the subnet where the claimed owner (e.g., Device$_1$ 202) is located. Thus, the ticket issuer 304 confirms that the Prefix utilized is topologically correct for the claimed owner (e.g., Device$_1$ 202). In accordance with some aspects, this can be confirmed by the ticket issuer 304 sending some information (e.g., a cookie), at 1006, to the claimed address owner utilizing the claimed IP address and requesting the same information (e.g., the cookie) to be returned, at 1008, to the ticket issuer.

At 1010, an Interface ID (IID) Validation can be provided, which can include a signed ticket. The Prefix portion that is responsible for routing a packet to its subnet can be validated by the procedure defined above. However, the Interface ID, which identifies the end device on that subnet, should have further validation. The further validation is a function of the technology utilized because two devices physically connected to the same subnet can be enabled to see each other's packet. In this situation, a device can provide proof that it owns the IID by creating an ID. In accordance with some aspects, this ID can be defined by the specification for Cryptographically Generated Addresses (CGA). However, it should be understood that the ID can be defined though other techniques.

Figure 11:
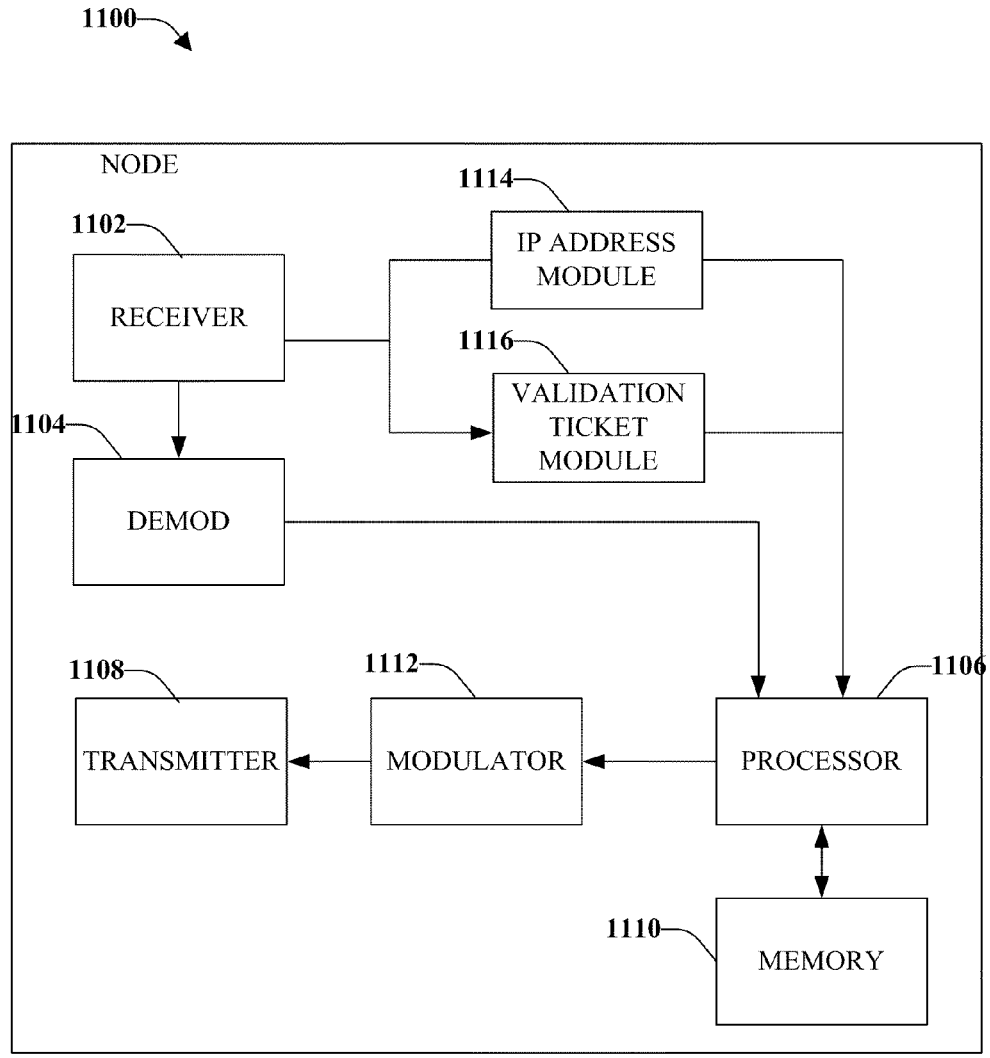
FIG. 11 illustrates a system that enables validation of IP addresses in accordance with one or more of the disclosed aspects.

With reference now to FIG. 11, illustrated is a system 1100 that validation of IP addresses in accordance with one or more of the disclosed aspects. System 1100 can reside in a user device. System 1100 comprises a node 1102 that can receive a signal from, for example, a receiver antenna. The node 1102 can perform typical actions thereon, such as filtering, amplifying, downconverting, etc. the received signal. The node 1102 can also digitize the conditioned signal to obtain samples. A demodulator 1104 can obtain received symbols for each symbol period, as well as provide received symbols to a processor 1106.

Processor 1106 can be a processor dedicated to analyzing information received by node 1102 and/or generating information for transmission by a transmitter 1108. In addition or alternatively, processor 1106 can control one or more components of user device 1100, analyze information received by node 1102, generate information for transmission by transmitter 1108, and/or control one or more components of user device 1100. Processor 1106 can include a controller component capable of coordinating communications with additional user devices.

User device 1100 can additionally comprise memory 1110 operatively coupled to processor 1106 and that can store information related to coordinating communications and any other suitable information. Memory 1110 can additionally store protocols associated with sample rearrangement. It will be appreciated that the data store (e.g., memories) components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 908 of the subject systems and/or methods is intended to comprise, without being limited to, these and any other suitable types of memory. User device 1100 can further comprise a symbol modulator 1112 and a transmitter 1108 that transmits the modulated signal.

Node 1102 is further operatively coupled to an IP address module 1114 that is configured to obtain an IP address over a first interface from a network that issues IP addresses. IP address module 1114 is also configured to request validation of the IP address from a trusted third party. If the trusted third party validates the IP address, a validation ticket is received and retained by validation ticket module 1116. The validation ticket can be utilized by node 1102 to communicate to another network over another interface.

Figure 12:
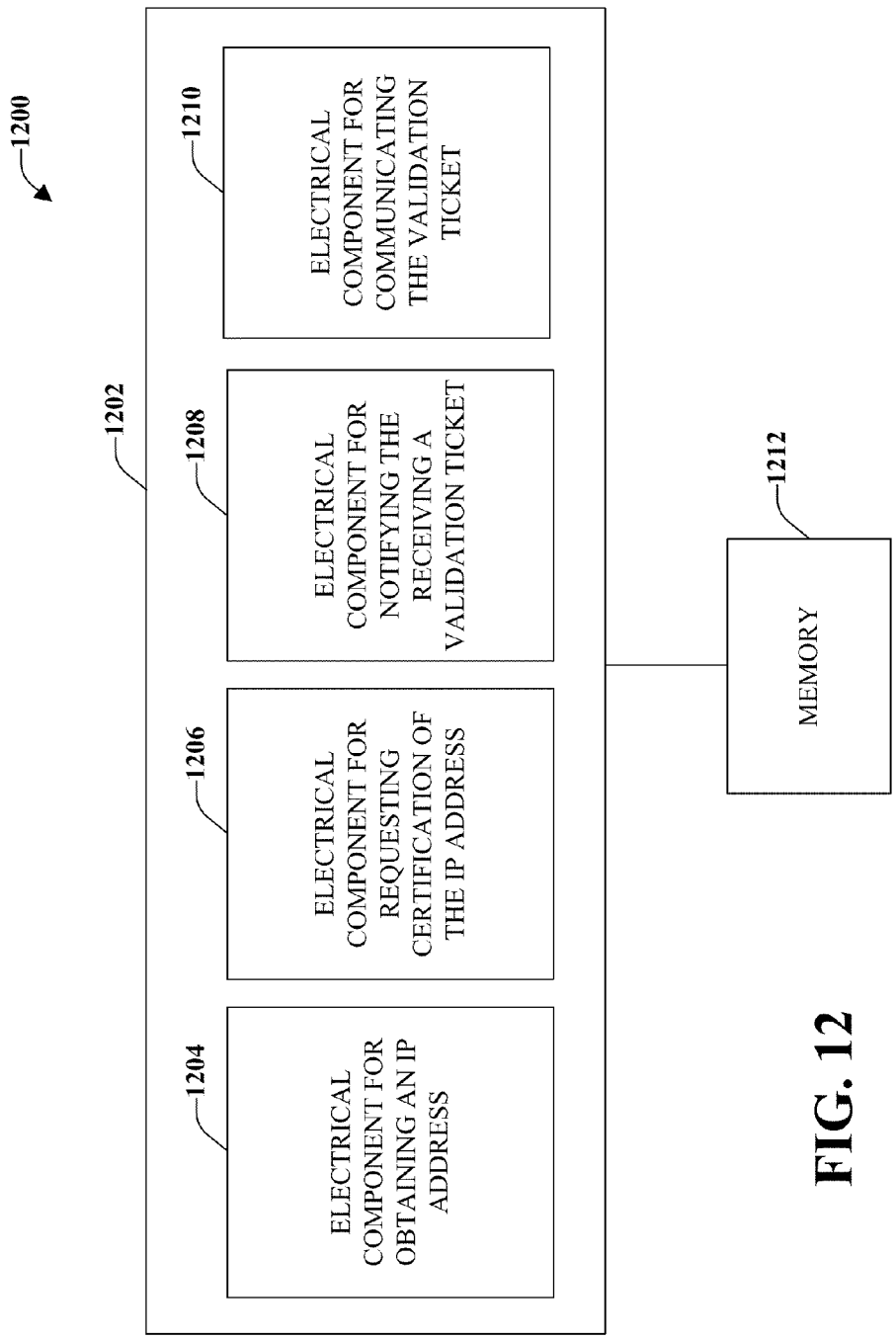
FIG. 12 illustrates an example system that enables third party validation of IP addresses in a peer-to-peer environment according to various aspects.

With reference to FIG. 12, illustrated is an example system 1200 that enables third party validation of IP addresses in a peer-to-peer environment according to various aspects. For example, system 1200 can reside at least partially within a mobile device. It is to be appreciated that system 1200 is represented as including functional blocks, which may be functional blocks that represent functions implemented by a processor, software, or combination thereof (e.g. firmware).

System 1200 includes a logical grouping 1202 of electrical components that can act separately or in conjunction. Logical grouping 1202 includes an electrical component 1204 for obtaining an IP address. The IP address can be obtained over a first interface. In accordance with some aspects, the IP address is obtained from a ticket issuer. The IP address can include a Prefix and an Interface Identifier.

Logical grouping 1202 also includes an electrical component 1206 for requesting certification for the IP address from a trusted third party and an electrical component 1208 for receiving a validation ticket that includes the certified IP address. Also included in logical grouping 1202 is an electrical component 1210 for communicating the validation ticket to a node. In accordance with some aspects, the validation ticket can be communicated to the node over an interface, different from the interface utilized to obtain the IP address. The validation ticket can include a signature of the trusted third party.

According to some aspects, at least part of the IP address is obtained over a first interface and the validation ticket is communicated to the node over a second interface. In accordance with some aspects, at least part of the IP address is obtained from a ticket issuer.

In accordance with some aspects, logical grouping 1202 includes an electrical component for participating in a return routability test. In accordance with this aspect, logical grouping 1202 can include an electrical component for receiving information from a validation entity and an electrical component for replying with a subset of the information. If the subset of information is not returned, the IP address is not validated. The IP address can include a signature of the trusted third party.

According to some aspects, the IP address includes a Prefix and an Interface Identifier. Validation of the IP address indicates if the Prefix, the Interface Identifier, or both the Prefix and the Interface Identifier are valid. According to some aspects, logical grouping 1202 can include an electrical component for obtaining the Prefix from the trusted third party or another trusted party and an electrical component for cryptographically generating the Interface Identifier.

Additionally, logical grouping 1202 can include an electrical component for receiving from a peer node an authorization ticket that includes an IP address of the peer node. The authorization ticket of the peer node is validated by a third party. Also included can be an electrical component for checking a third party signature included in the peer node authorization ticket. Further, logical grouping 1202 can include an electrical component for determining the IP address of the peer node is valid if the check of the third party signature is correct.

Additionally, system 1200 can include a memory 1212 that retains instructions for executing functions associated with electrical components 1204, 1206, 1208, and 1210 or other components. While shown as being external to memory 1212, it is to be understood that one or more of electrical components 1204, 1206, 1208, and 1210 can exist within memory 1212.

Figure 13:
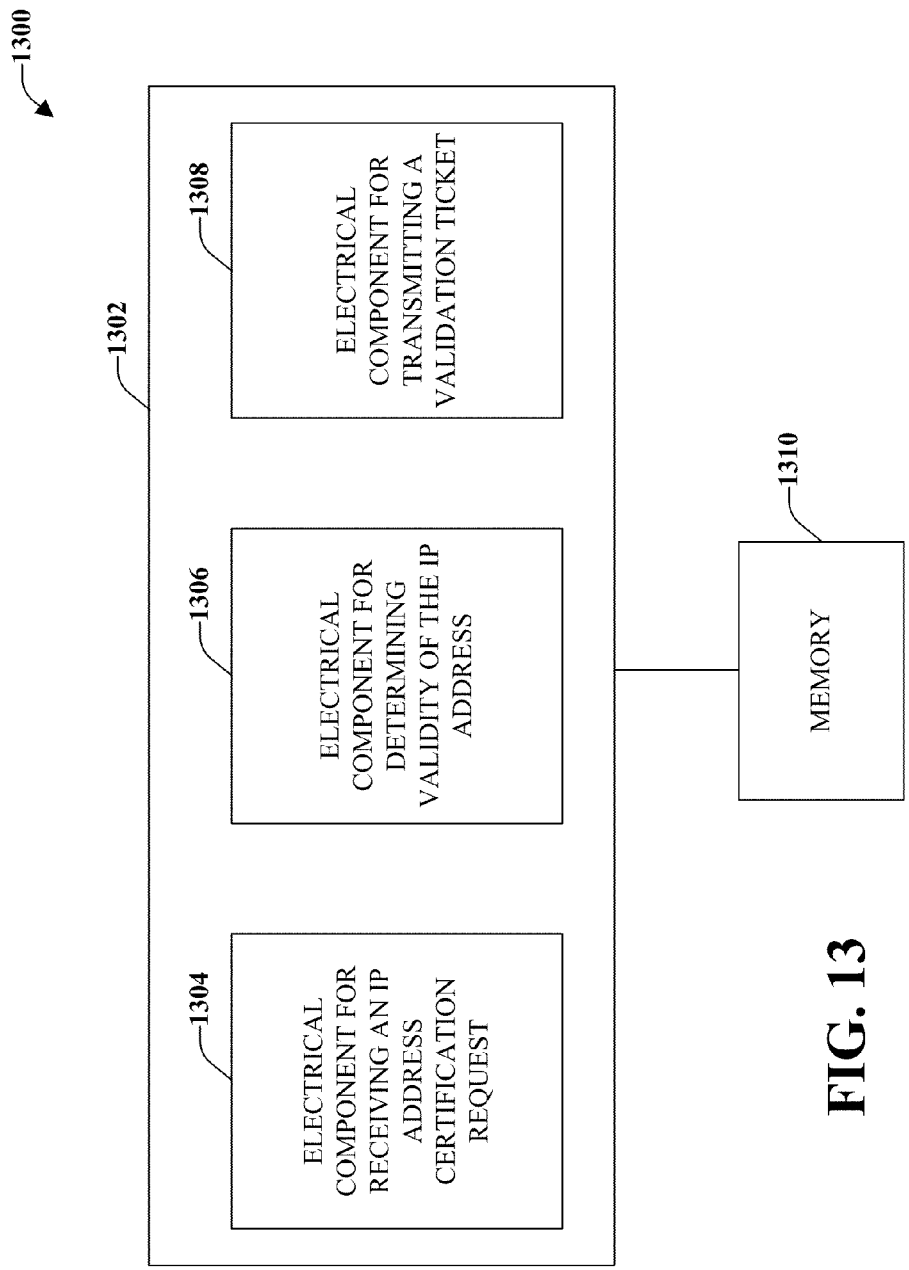
FIG. 13 illustrates an example system that enables third party validation of IP addresses according to one or more of the aspects presented herein.

FIG. 13 illustrates an example system 1300 that enables third party validation of IP addresses according to one or more of the aspects presented herein. System 1300 is represented as including functional blocks, which may be functional blocks that represent functions implemented by a processor, software, or combination thereof (e.g., firmware).

System 1300 includes a logical grouping 1302 of electrical components that can act separately or in conjunction.

Included in logical grouping 1302 is an electrical component 1304 for receiving from a first node a request for certification of an IP address. The IP address can include a Prefix and an Interface Identifier.

Also included in logical grouping 1302 is an electrical component 1306 for determining validity of the IP address. Logical grouping 1302 also includes an electrical component 1308 for transmitting a validation ticket certified by a trusted third party to the first node. The validation ticket includes the IP address. In accordance with some aspects, the validation ticket includes a signature of the trusted third party.

In accordance with some aspects, the IP address includes a Prefix and an Interface Identifier. According to this aspect, logical grouping 1302 includes an electrical component for utilizing a return routability test to check the validity of the Prefix. Also included can be an electrical component for verifying the validity of the Interface Identifier. Additionally, logical grouping 1302 can include an electrical component for performing Cryptographically Generated Address verification in order to verify the validity of the Interface Identifier Determining the validity of the IP address can include a return routability test. To perform the return routability test, logical grouping 1302 can include an electrical component for sending information to the first node. The information can include a request for the first node to return at least a subset of information. Also included in logical grouping 1302 can be an electrical component for determining if at least a subset of the information is received from the first node.

In accordance with some aspects, the IP address includes a Prefix and an Interface Identifier and determining validity of the IP address includes ascertaining if the Prefix, the Interface Identifier, or both the Prefix and the Interface Identifier are valid.

System 1300 can include a memory 1310 that retains instructions for executing functions associated with electrical components 1304, 1306, and 1308 or other components. While shown as being external to memory 1310, one or more of electrical components 1304, 1306, and 1308 can exist within memory 1310.

It is to be understood that the aspects described herein may be implemented by hardware, software, firmware or any combination thereof. When implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor through various means as is known in the art. Further, at least one processor may include one or more modules operable to perform the functions described herein.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), CDMA2000, etc. UTRA includes Wideband-CDMA (W-CDMA) and other variants of CDMA. Further, CDMA2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, CDMA2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product may include a computer readable medium having one or more instructions or codes operable to cause a computer to perform the functions described herein.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine-readable medium and/or computer readable medium, which may be incorporated into a computer program product.

While the foregoing disclosure discusses illustrative aspects and/or aspects, it should be noted that various changes and modifications could be made herein without departing from the scope of the described aspects and/or aspects as defined by the appended claims. Accordingly, the described aspects are intended to embrace all such alterations, modifications and variations that fall within scope of the appended claims. Furthermore, although elements of the described aspects and/or aspects may be described or claimed in the singular, the plural is contemplated unless limitation to the singular is explicitly stated. Additionally, all or a portion of any aspect and/or aspect may be utilized with all or a portion of any other aspect and/or aspect, unless stated otherwise.

To the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description of the claims is meant to be a "non-exclusive or".

What is claimed is:

1. A method for enabling a third party validation of Internet Protocol (IP) addresses, comprising:
    accessing a first network by a first node over a first communication interface;
    obtaining by the first node an IP address from the first network, wherein the IP address from the first network is valid and comprises a Prefix and an Interface Identifier;
    requesting by the first node a certification for the IP address from a trusted third party;
    receiving, by the first node, return-routability information that includes a cookie, sent from the trusted third party based on the Prefix, in response to requesting the certification for the IP address from the trusted third party;
    sending at least a subset of the return-routability information, including the cookie, by the first node to the trusted third party;
    receiving by the first node a validation ticket from the trusted third party that includes the certified IP address and a signature of the trusted third party, wherein:
        the validation ticket indicates whether at least one of the Prefix and the Interface Identifier is valid; and
        the trusted third party certifies the Prefix only in response to the subset of the return-routability information, including the cookie, sent by the first node to the trusted third party matching a corresponding subset of the return-routability information, including the cookie, received by the first node from the trusted third party;
    accessing a second network by the first node over a second communication interface; and
        transmitting the validation ticket by the first node to a second node in the second network over the second communication interface,
    wherein the second node verifies the IP address based on the signature of the trusted third party included in the transmitted validation ticket and, in response to a successful verification, the second node allows further communication with the first node over the second network.

2. The method of claim 1, further comprising:
    obtaining the Prefix from the trusted third party or another trusted party; and
    cryptographically generating the Interface Identifier.

3. The method of claim 1, wherein at least part of the IP address is obtained from a ticket issuer.

4. The method of claim 1, further comprising:
    receiving from a peer node an authorization ticket that includes an IP address of the peer node, wherein the authorization ticket is validated by a third party;
    checking a third party signature included in the peer node authorization ticket; and
    determining the IP address of the peer node is valid if the check of the signature is correct.

5. A communications apparatus for enabling a third party validation of Internet Protocol (IP) addresses, comprising:
    a memory having stored thereon processor-executable instructions; and
    a processor, coupled to the memory, wherein the processor-executable instructions stored in the memory are executed by the processor, the processor configured to:
    access a first network over a first communication interface;
    obtain an IP address from the first network, wherein the IP address from the first network is valid and comprises a Prefix and an Interface Identifier;
    request a certification for the IP address from a trusted third party;
    receive return-routability information, including a cookie, sent from the trusted third party based on the Prefix, in response to requesting the certification for the IP address from the trusted third party;
    send at least a subset of the return-routability information, including the cookie, to the trusted third party;
    receive a validation ticket from the trusted third party that includes the certified IP address and a signature of the trusted third party, wherein:
        the validation ticket indicates whether at least one of the Prefix and the Interface Identifier is valid; and the trusted third party certifies the Prefix only in
response to the subset of the return-routability information, including the cookie, sent to the trusted third party matching a corresponding subset of the return-routability information, including the cookie, received from the trusted third party;
access a second network over a second communication interface; and
transmit the validation ticket to a second node in the second network over the second communication interface,
wherein the second node verifies the IP address based on the signature of the trusted third party included in the transmitted validation ticket and, in response to a successful verification, the second node allows further communication with the communications apparatus over the second network.

6. A communications apparatus for enabling a third party validation of Internet Protocol (IP) addresses, comprising:
means for accessing a first network over a first communication interface;
means for obtaining an IP address from the first network, wherein the IP address from the first network is valid and comprises a Prefix and an Interface Identifier;
means for requesting a certification for the IP address as a certified IP address from a trusted third party;
means for receiving return-routability information, including a cookie, sent from the trusted third party based on the Prefix, in response to requesting the certification for the IP address from the trusted third party;
means for sending at least a subset of the return-routability information, including the cookie, to the trusted third party;
means for receiving a validation ticket from the trusted third party that includes the certified IP address and a signature of the trusted third party, wherein:
the validation ticket indicates whether at least one of the Prefix and the Interface Identifier is valid; and
the trusted third party certifies the Prefix only in response to the subset of the return-routability information, including the cookie, sent by the sending means to the trusted third party matching a corresponding subset of the return-routability information, including the cookie, received by the receiving means from the trusted third party;
means for accessing a second network over a second communication interface; and
means for transmitting the validation ticket to a second node in the second network over the second communication interface,
wherein the second node verifies the IP address based on the signature of the trusted third party included in the transmitted validation ticket and, in response to a successful verification, the second node allows further communication with the communications apparatus over the second network.

7. The communications apparatus of claim 6, the apparatus further comprising:
means for obtaining the Prefix from the trusted third party or another trusted party; and
means for cryptographically generating the Interface Identifier.

8. The communications apparatus of claim 6, further comprising:
means for receiving from a peer node an authorization ticket that includes an IP address of the peer node, wherein the authorization ticket is validated by a third party;
means for checking a third party signature included in the peer node authorization ticket; and
means for determining the IP address of the peer node is valid if the check of the third party signature is correct.

9. A non-transitory computer-readable medium having stored thereon processor executable instructions that, when executed by a processor, cause the processor to perform operations for enabling a third party validation of Internet Protocol (IP) addresses, the operations comprising:
accessing a first network over a first communication interface;
obtaining an IP address from the first network, wherein the IP address from the first network is valid and comprises a Prefix and an Interface Identifier;
requesting a certification for the IP address from a trusted third party;
receiving return-routability information, including a cookie, sent from the trusted third party based on the Prefix, in response to requesting the certification for the IP address from the trusted third party;
sending at least a subset of the return-routability information, including the cookie, to the trusted third party;
receiving a validation ticket from the trusted third party that includes the certified IP address and a signature of the trusted third party, wherein:
the validation ticket indicates whether at least one of the Prefix and the Interface Identifier is valid; and
the trusted third party certifies the Prefix only in response to the subset of the return-routability information, including the cookie, sent to the trusted third party matching a corresponding subset of the return-routability, including the cookie, received from the trusted third party;
accessing a second network over a second communication interface;
transmitting the validation ticket to a second node in the second network over the second communication interface,
wherein the second node verifies the IP address based on the signature of the trusted third party included in the transmitted validation ticket and, in response to a successful verification, the second node allows further communication with the processor over the second network.

10. The non-transitory computer-readable medium of claim 9, wherein the stored processor-executable instructions are configured to cause the processor to perform operations further comprising:
receiving from a peer node an authorization ticket that includes an IP address of the peer node, wherein the authorization ticket is validated by a third party;
checking a third party signature included in the peer node authorization ticket; and
determining the IP address of the peer node is valid if the check of the third party signature is correct.

* * * * *